US010065465B2

(12) United States Patent
Siegel

(10) Patent No.: US 10,065,465 B2
(45) Date of Patent: Sep. 4, 2018

(54) ARTICULATING COUPLER

(71) Applicant: Cequent Consumer Products, Inc., Solon, OH (US)

(72) Inventor: Theodore Joseph Siegel, Mayfield Heights, OH (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 15/379,794

(22) Filed: Dec. 15, 2016

(65) Prior Publication Data

US 2017/0174020 A1 Jun. 22, 2017

Related U.S. Application Data

(60) Provisional application No. 62/308,290, filed on Mar. 15, 2016, provisional application No. 62/269,587, filed on Dec. 18, 2015.

(51) Int. Cl.
*B60D 1/06* (2006.01)
*B60D 1/60* (2006.01)
*B60D 1/24* (2006.01)

(52) U.S. Cl.
CPC ............ *B60D 1/065* (2013.01); *B60D 1/24* (2013.01); *B60D 1/605* (2013.01)

(58) Field of Classification Search
CPC ................... B60D 1/065; B60D 1/24
USPC ....................................... 280/492
See application file for complete search history.

(56) References Cited

U.S. PATENT DOCUMENTS

| | | | |
|---|---|---|---|
| 4,125,272 A | 11/1978 | Putnam, Jr. | |
| 4,273,353 A * | 6/1981 | Holmes | B62D 53/021 |
| | | | 280/483 |
| 4,711,461 A * | 12/1987 | Fromberg | B60D 1/02 |
| | | | 280/494 |
| 5,011,176 A | 4/1991 | Eppinette | |
| 5,058,915 A | 10/1991 | Burns | |
| 5,560,630 A | 10/1996 | Phares | |
| 5,647,604 A | 7/1997 | Russell | |
| 6,494,478 B1 | 12/2002 | Mackarvich | |
| 6,619,686 B1 * | 9/2003 | Klar | B60D 1/54 |
| | | | 280/491.3 |

(Continued)

FOREIGN PATENT DOCUMENTS

EP 2643175 10/2013

*Primary Examiner* — Tony H Winner
(74) *Attorney, Agent, or Firm* — McDonald Hopkins LLC

(57) ABSTRACT

The present disclosure includes an articulated coupler for attachment between a towed vehicle and a towing vehicle. The articulated coupler includes a first attachment member for attachment to the towing vehicle and a second attachment member for attachment to the towed vehicle. A ball joint member extends between the first and second attachment member. The ball joint member includes a ball at a proximal end and an elongated portion at a distal end such that the elongate portion is attachable to the first attachment member and the ball is attached to the second attachment member. The ball is retained to the second attachment member with a collar. The collar may have an aperture with an elliptical shape and a surface with a concave shape for defining a pivotal range of motion. The ball joint member may be pivotal relative to the first attachment member and may be rotatable and pivotal relative to the second attachment member.

21 Claims, 9 Drawing Sheets

(56) References Cited

U.S. PATENT DOCUMENTS

| | | |
|---|---|---|
| 6,957,826 B1 | 10/2005 | MacKarvich |
| 7,044,493 B1 | 5/2006 | Wilson |
| 7,293,791 B1 | 11/2007 | Williams, Jr. |
| 7,562,893 B2 | 7/2009 | Donnard |
| 7,584,984 B1 | 9/2009 | Williams, Jr. |
| 8,210,559 B2 | 7/2012 | Russell |
| 8,226,106 B2 | 7/2012 | Hensley |
| 8,356,831 B2 | 1/2013 | Pollock |
| 8,408,576 B2 | 4/2013 | Volk |
| 8,567,807 B2 | 10/2013 | Su |
| 8,814,198 B2 | 8/2014 | Wolfe |
| 9,283,822 B1* | 3/2016 | Krapf ........................ B60D 1/24 |
| 2006/0138746 A1 | 6/2006 | Donnard |
| 2007/0178978 A1* | 8/2007 | Boutin ..................... F16J 3/042 |
| | | 464/175 |
| 2008/0106065 A1 | 5/2008 | Cutts |
| 2009/0302573 A1* | 12/2009 | Nye, Jr. ................... B60D 1/02 |
| | | 280/492 |
| 2010/0225092 A1* | 9/2010 | Hudson ................... B60D 1/00 |
| | | 280/494 |
| 2010/0320739 A1 | 12/2010 | Kittrell |
| 2011/0175324 A1 | 7/2011 | Russell |
| 2013/0056957 A1 | 3/2013 | Volk |
| 2013/0076008 A1 | 3/2013 | Su |

* cited by examiner

ARTICULATING COUPLER

CROSS-REFERENCE TO RELATED APPLICATION

This application claims priority to U.S. Provisional application No. 62/308,290 filed Mar. 15, 2016 and to U.S. Provisional Application No. 62/269,587 filed Dec. 18, 2015, which are hereby incorporated by reference in their entirety.

TECHNICAL FIELD

The present invention relates to an articulating coupler and more particularly, to coupler for attaching a hitch member of a towing vehicle to a trailer of a towed vehicle that is configured for increased freedom of movement.

BACKGROUND

A variety of uses have arisen for pulling or towing a trailer or other "towed vehicle" to accompany a motor vehicle or other "towing vehicle." Hitching a towed vehicle to a towing vehicle has been accomplished by a variety of different structures and techniques. In some settings it is desirable to permit and define the manner and range of linear and rotational displacement permitted for a towed vehicle relative to its connection with the towing vehicle.

Conventional trailer hitches usually comprise a single tongue connected to the forwardmost wheel axis of the towed vehicle and extending forwardly for pivotable connection, usually by a coupling, with a hitch member mounted on the towing vehicle at its rear end. For example, the hitch member is oftentimes secured to the rear bumper or rear frame of the towing vehicle. The effective pivot point between the towing vehicle and the towed vehicle in such conventional trailer hitches is therefore at the coupling between the single tongue and the hitch member at the rear of the towing vehicle. As a result, there is established a lever arm between such pivotable connection and the center of gravity of the towing vehicle. Consequently, a significant force is applied to the towing vehicle by the towed vehicle, for example, when the vehicles are rounding a curve or a corner tending to displace or sway the towing vehicle. Further, various forces are also experienced when the towing vehicle is traversing over terrain of a different grade than the towed vehicle such as in an off road condition over hills, crevices, or downslope conditions. Many times, control over both vehicles may be reduced and in some cases lost.

Further, when a towed vehicle and a towing vehicle are to be connected, the driver of the towing vehicle must be given directions in order to back the towing vehicle such that the hitch is in exact alignment with the towed vehicle hitch. Usually, the hitch of the towing vehicle is in the general vicinity of the hitch of the towed vehicle, i.e., within one or two feet of perfect alignment. When the alignment is not perfect, but is within several inches, the usual procedure is to manually move the towed vehicle so that the two hitches will become properly aligned as to allow the connection to be made. If the tongue weight of the towed vehicle, such as in the case of a heavy recreational trailer or large boat, is substantial, then the task is compounded and several individuals may be required to accomplish the final connection. In the prior art, there exist motorized dollies which fit under the tongue of the towed vehicle so that the tongue movement of the towed vehicle can be more easily accomplished. While this method is effective, the purchase of such equipment is expensive and considerable maintenance is required to insure that it will be in good operating condition when it is needed.

Thus, there is a need in the art to provide a solution that minimizes or eliminates the foregoing and other problems associated with prior trailer hitches and provides a novel and improved articulated coupler having various advantages in construction, mode of operation, and use in comparison with such prior hitches.

SUMMARY

The present disclosure includes an articulated coupler for attachment between a towed vehicle and a towing vehicle. The articulated coupler includes a first attachment member for attachment to the towing vehicle and a second attachment member for attachment to the towed vehicle. A coupling member extends between the first and second attachment member. The coupling member includes a ball at a proximal end and an elongated portion at a distal end such that the elongated portion is selectively attachable to the first attachment member and the ball is selectively attached to the second attachment member. The ball is retained to the second attachment member with a collar. The collar may have an aperture with an elliptical shape and a surface with a concave shape for defining a pivotal range of motion. The coupling member may be pivotal relative to the first attachment member and may be rotatable and pivotal relative to the second attachment member.

In one embodiment, the articulated coupler includes a first attachment member and a coupling member that are not pivotal relative to one another wherein the coupling member may be rotatable and pivotal relative to the second attachment member.

In one embodiment, provided is an articulating coupler comprising a first attachment member to be selectively attached to a towing vehicle and a second attachment member to be selectively attached to a towed vehicle. A coupling member may be attached to the first attachment member and the second attachment member such that the coupling member may be pivotal relative to the first attachment member and the coupling member may be rotatable and pivotal relative to the second attachment member. The first attachment member may be selectively attached to a hitch member of a vehicle. The first attachment member includes a connection member to attach the first attachment member to the coupling member. The connection member may include a first arm and a second arm that extend from opposite portions of a base such that the coupling member is attached between the first arm and the second arm.

The coupling member may includes a ball at a proximal end and an elongated portion at an opposite distal end wherein the ball is received within the second attachment member. The second attachment member may include an opening and a collar to receive the ball of the coupling member. The second attachment member may include an inner housing and an outer housing such that the inner housing is received within the outer housing. The inner housing may include a tapered edge configured to be inserted within a cavity of the outer housing. The ball of the coupling member may be pivotal and rotatable relative to the inner housing of the second attachment member. The collar may be attached to the inner housing to retain the ball. The collar, inner housing, and coupling member may be configured to allow the coupling member to pivot within a range of motion relative to the second attachment member, wherein the range of motion is between 30-60 degrees from an axis of the coupling member. More particularly, the range of motion may be about 45 degrees from the axis of the coupling member. The collar may include an aperture having a generally elliptical shape to allow the coupling member to pivot and abut against a surface of the collar within a range of motion relative to the second attachment member. The pivotal range of motion of the coupling member relative to the second attachment member along a first plane may be between 20-40 degrees while the pivotal range of motion of the coupling member relative to the second attachment member along a second plane may be between 30-60 degrees. The first plane may be generally perpendicular to the second plane.

In another embodiment, provided is an articulating coupler comprising a first attachment member to be selectively attached to a towing vehicle and a second attachment member to be selectively attached to a towed vehicle. A coupling member may be attached to the first attachment member and the second attachment member such that the coupler member is pivotal relative to the first attachment member and the coupling member is pivotal relative to the second attachment member. A cover may be positioned around the coupling member. The coupling member may also be rotatable relative to the second attachment member. The cover may be positioned around a portion of the first attachment member and a portion of the second attachment member. The connection member may include a general U-shaped configuration that includes a first arm and a second arm that extend from opposite portions of a header and a base such that the coupling member is attached between the first arm and the second arm.

The coupling member may include a damper positioned along an extended portion and received within the connection member. The coupling member may be pivotal within a range of motion relative to the connection member, wherein the range of motion is between 0-20 degrees from an axis of the coupling member in a first direction and is between 0-20 degrees from the axis of the coupling member in a second opposite direction. A pitch of the articulating coupler along a first plane may be between 40-80 degrees wherein the pitch is the combined range of motion along a first axis aligned along the attachment between the coupling member and the first attachment member and a second axis aligned along the attachment between the coupling member and the second attachment member. The pivotal range of motion between the coupling member and the second attachment member along a second plane that is generally perpendicular to the first plane may be between 60-120 degrees.

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

Figure 1:
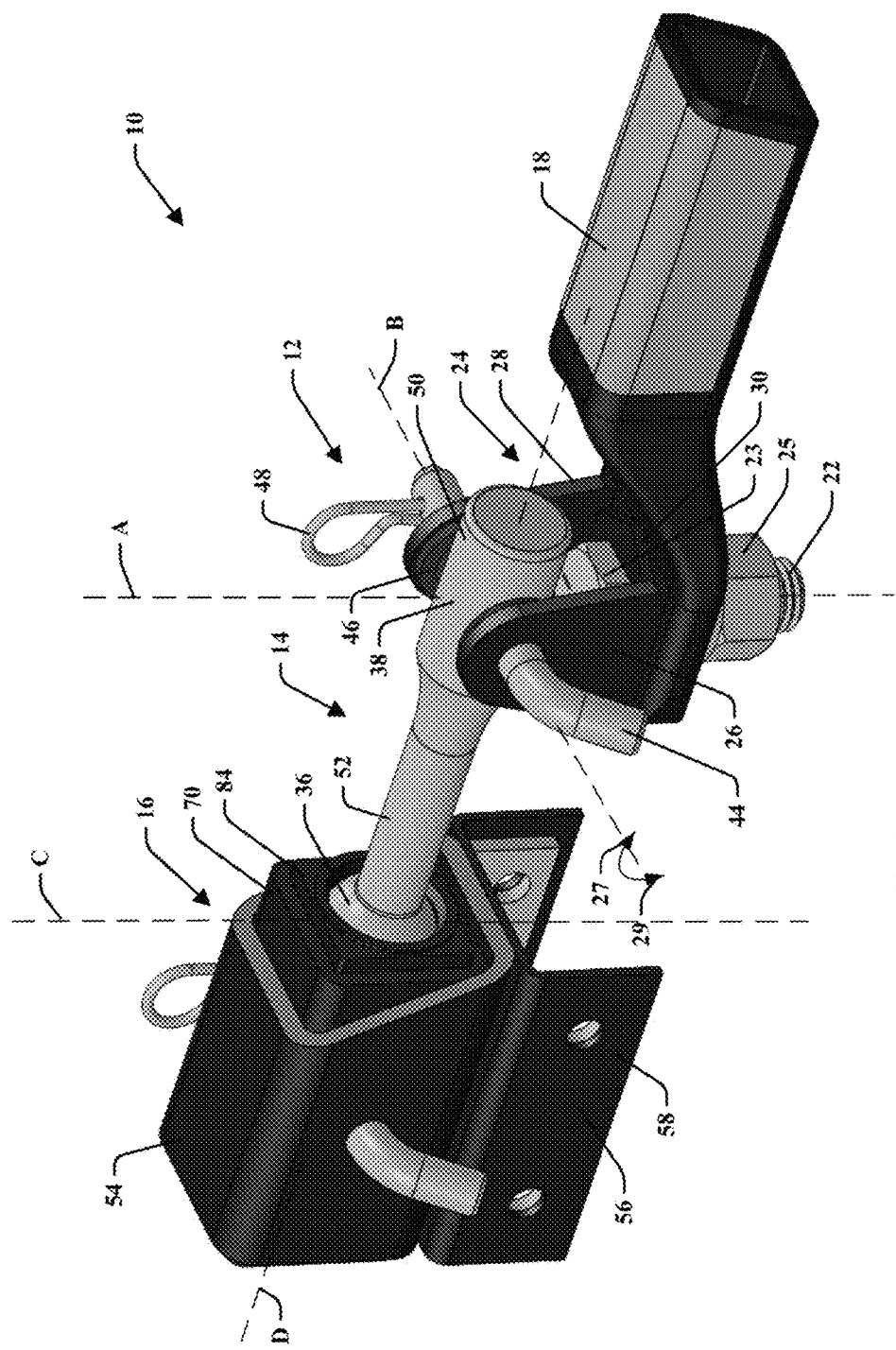
FIG. 1 is a perspective view of one embodiment of the articulated coupler of the present disclosure attached to a vehicle hitch.
Figure 2:
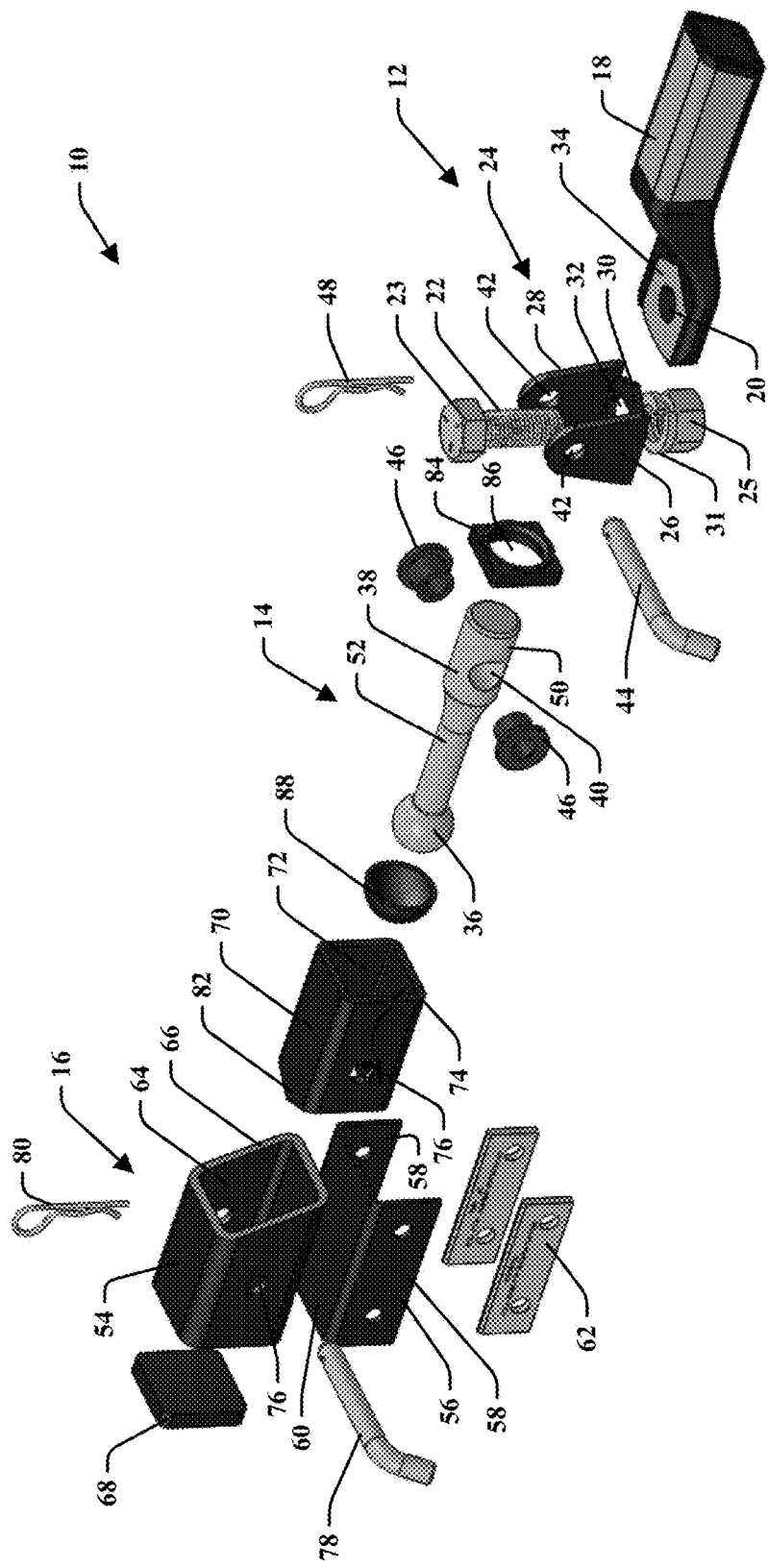
FIG. 2 is an exploded perspective view of the articulated coupler of FIG. 1 of the present disclosure.

FIGS. 1 and 2 illustrate an articulated coupler 10 that includes a configuration having multiple degrees of freedom to couple a towed vehicle to a towing vehicle. The articulated coupler 10 may be capable of selectively attaching to the towed vehicle and the towing vehicle in any appropriate manner. In one embodiment, the articulating coupler 10 includes a first attachment member 12, a coupling member 14 and a second attachment member 16. The first attachment member 12 is configured to be selectively attached to the towing vehicle and the second attachment member 16 is configured to be selectively attached to the towed vehicle. The coupling member 14 extends between the first attachment member 12 and the second attachment member 16. In one embodiment, the first attachment member 12 includes a configuration that may be selectively attached to a hitch member 18. The hitch member 18 may be a conventional hitch ball mount that includes an aperture 20 for receiving a fastener 22 or a conventional ball mount (not shown). See FIG. 2. However, in place of the conventional ball mount, the first attachment member 12 may include a connection member 24 to connect the coupling member 14 to the hitch member 18. The connection member 24 may include a first arm 26 and a second arm 28 that extend from opposite portions of a base 30. The base 30 may include an aperture 32 that may align with the aperture 20 of the hitch member 18 for receiving the fastener 22 along a first axis A. The first arm 26 may be spaced from and include a similar configuration as the second arm 28.

The hitch member 18 may include a recessed portion 34 positioned axially relative to the aperture 20. The base 30 of the connection member 24 may include a perimeter, whereby a majority portion of the perimeter of the base 30 may be engageable with the recess portion 34 to prevent rotation of the connection member 24 relative to the hitch member 18 about the first axis A. In one embodiment, the recessed portion 34 may be acircular and the perimeter of the base 30 may generally conform within the recess portion 34. However, this invention is not limited as the connection member 24 may be selectively attachable to other types of hitch members such as a hitch member without a recess portion.

The coupling member 14 may include a ball 36 at a proximal end and an elongated portion 38 at an opposite distal end. A shaft 52 may be spaced between the ball 36 and the elongated portion 38. The coupling member 14 may be a continuous piece of material such as a metal or alloy. The elongated portion 38 may include a through-hole 40 that aligns with through-holes 42 that extend through both the first arm 26 and second arm 28 of the connection member 24. A hitch pin 44 may be received within the through-holes 40 of the elongated portion 38 and the through-holes 42 of the first and second arms 26, 28 to pivotally retain the coupling member 14 to the connection member 24. A clip 48 may be inserted into the hitch pin 44 to retain the hitch pin 44 in place. In this configuration, the coupling member 14 may pivot about an axis B that may be generally aligned along the hitch pin 44. Inserts 46 may be placed between the elongated portion 38 of the coupling member 14 and the first arm 26 and second arm 28 of the connection member 24. The inserts 46 may be made of a polymer or alloy that can be inserted within the through-hole 42 of the elongated portion 38 while receiving the hitch pin 44 therein. The inserts 46 may allow for structural stability between the hitch pin 44, connection member 24, and coupling member 14 while allowing the coupling member 14 to pivot about axis B. The inserts 46 may assist to prevent rattling between the coupling member 14 and the connection member 24.

Axis B may be generally aligned along the hitch pin 44 as it is positioned through the coupling member 14 and the arms 26, 28 of the connection member 24. In one embodiment, axis B may be generally normal to axis A. Further, axis B may intersect axis A. Alternatively, axis A may also may be generally offset from axis B. In one embodiment, the coupling member 14 may pivot about axis B but not rotate or pivot about axis A such that the coupling member 14 only pivots within plane DA defined by axis A and axis D of FIG. 1.

The fastener 22 may extend through the aperture 32 of the base 30 of the connection member 24 and through the aperture 20 of the hitch member 18 along axis A. The fastener 22 may be a conventional fastener having threads and including a head 23 and a nut 25 to mechanically fasten the connection member 24 to the hitch member 18. Additionally, a washer 31, such as a spring washer may be used to assist with this assembly.

In one embodiment, the coupling member 14 includes an extended portion 50 that extends between the through-hole 42 and the distal end towards the hitch member 18. The extended portion 50 may define the pivotal freedom of motion of the coupling member 14 relative to the hitch member 18. As the ball 36 of the coupling member 14 is pivoted in a first direction 27 relative to the connection member 24, the extended portion 50 may contact either the connection member 24, the head 25 of the fastener, or the hitch member 18 and be prevented from further pivoting in the first direction 27. As the ball 36 of the coupling member 14 is pivoted in a second direction 29 relative to the connection member 24, the shaft 52 may contact either the connection member 24, the head 25 of the fastener 22, or the hitch member 18 and be prevented from further pivoting in the second direction 29. As generally illustrated by FIG. 1, the coupling member is aligned along axis D. The described configuration allows for a range of motion of the coupling member 14 to be pivoted between about 30-50 degrees in the first direction 27 relative to axis D and more particularly about 40 degrees. Additionally, the coupling member 14 may be pivoted between about 30-50 degrees in the second direction 29 relative to axis D and more particularly about 40 degrees.

FIG. 1 shows the ball 36 at the proximal end of the coupling member 14 and pivotally and rotatably attached to the second attachment member 16. The second attachment member 16 may include an outer housing 54 that is selectively attached to the towed vehicle. In one embodiment, the outer housing 54 includes a C-channel 56 having a pair of sides 58 spaced from each other that extend from opposite sides of a base 60. The C-channel 56 may be selectively attachable to a frame of the towed vehicle (not shown). Spacers 62 may be placed adjacent the sides 58 to reduce excess space between the frame and the C-channel 56 to allow for a snug attachment fit with the frame. However, the second attachment member 16 may include various embodiments to selectively attach to various other geometric arrangements of frames of towed vehicles and this disclosure is not limited in this regard.

As illustrated by FIG. 2, the outer housing 54 may define a cavity 64 that includes an opening 66 and a hard-stop 68 positioned at an opposite side of the opening 66. In one embodiment, the outer housing 54 is made of tube steel that includes a generally square cross sectional perimeter. However, the outer housing 54 may be made of a polymer or alloy and may include various geometrical configurations and this disclosure is not limited.

An inner housing 70 may be configured to be received within the cavity 64 of the outer housing 54. The inner housing may also define a cavity 72 that includes an opening 74 to receive the ball 36 of the coupling member 14. The outer housing 54 and inner housing 70 may include through-holes 76 that are configured to be aligned with one another to allow a hitch pin 78 to extend therethrough to retain the inner housing 70 within the cavity 64 of the outer housing 54. A clip 80 may be inserted into the hitch pin 78 to retain the hitch pin 78 in place.

The outer housing 54 may include an angled opening 66 such as a "French cut" opening as illustrated by FIG. 2. The inner housing 70 may include a tapered edge 82 opposite from the opening 74. This configuration may allow the inner housing 70 to be easily inserted within the cavity 64 of the outer housing 54 when the second attachment member 16 and the coupling member 14 are not in direct alignment. This arrangement allows a user to place the towing vehicle in reverse to align the hitch member 18 in close but not exact position adjacent the towed vehicle frame such that the user may easily insert the tapered edge 82 of the inner housing 70 within the angled opening of the outer housing 54.

The ball 36 of the coupling member 14 may be received within the second attachment member 16. The ball 36 may be pivotally and rotatably attached to the inner housing 70. In one embodiment, a collar 84 having an aperture 86 is positioned within the opening 74 of the inner housing 70 to pivotally and rotatably retain the ball 36 within the cavity 72 of the inner housing 70. A cup 88 may be attached to the collar 84 such that the ball 36 is positioned between the cup 88 and the collar 84 within the cavity 72.

This configuration allows the coupling member 14 to be pivotally attached to the inner housing 70 along axis C as illustrated by FIG. 1. In this embodiment, the coupling member 14 is rotatable 360 degrees along axis D relative to the second attachment member 16. Additionally, the coupling member 14 is pivotal along axis C relative to the second attachment member 16. Further, the coupling member 14 may be pivotal relative to the second attachment member 16 to the extent that the shaft 52 of the coupling member 14 may come in abutting contact with the collar 84 as the ball 36 is retained within the inner housing 70. The collar 84 may be welded to the inner housing 70 and the cup 88 may be welded to the collar 84 to allow the ball to freely move between the cup 88 and collar 84.

Figure 3:
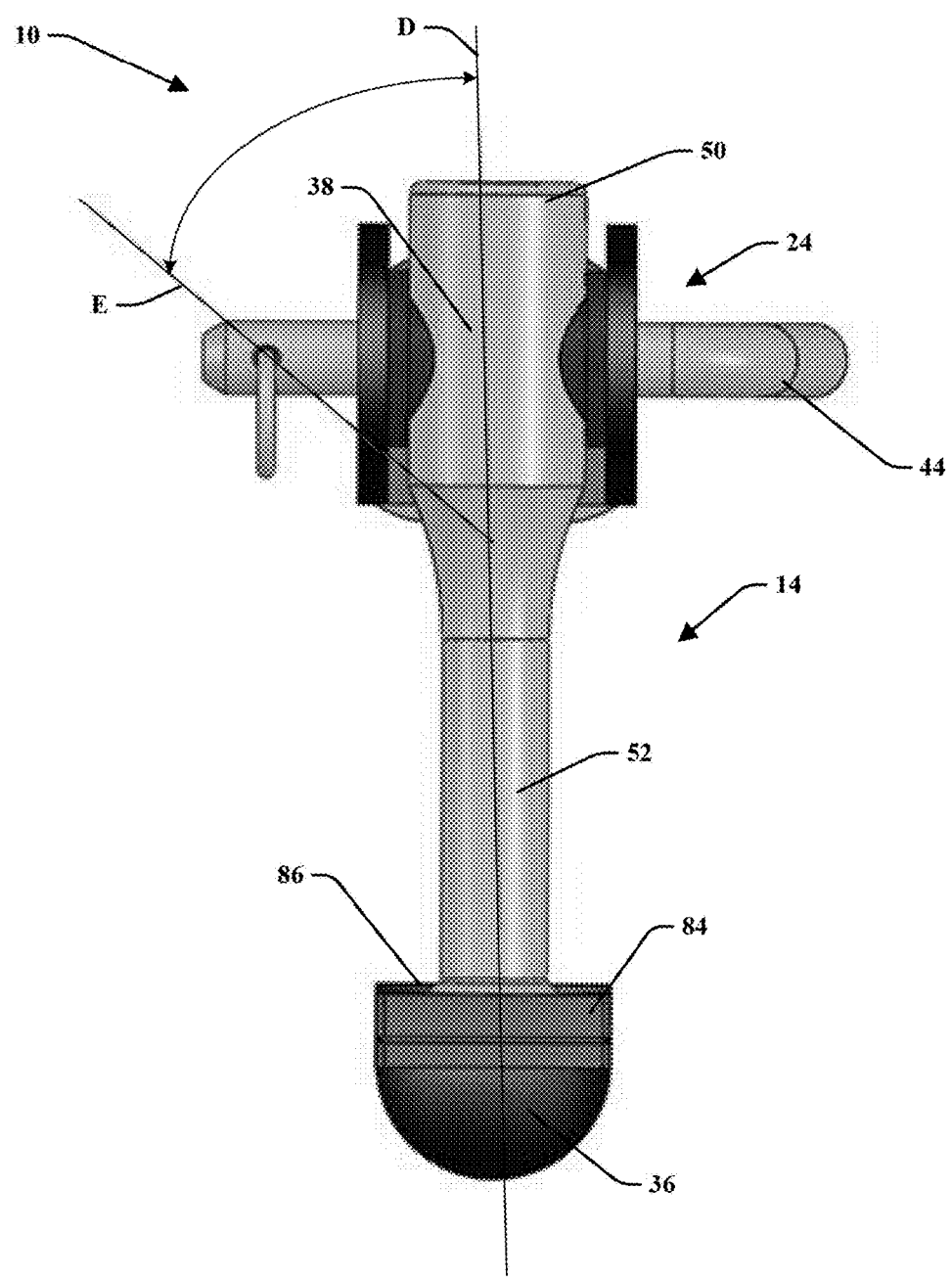
FIG. 3 is a partial top view of a coupling member of the articulated coupler of FIG. 1 of the present disclosure.

In one embodiment, the elongated portion 38 is pivotally attached to the first attachment member 12 and the ball 36 is rotationally and pivotally attached to the second attachment member 16. FIG. 3 illustrates the elongated portion 38 attached to the connection member 24 and the ball 36 positioned between the cup 88 and the collar 84. Here the inner housing is removed for illustrative purposes. Axis D may be aligned along the coupling member 14 and angle axis E may extend from axis D. Angle axis E illustrates a range of motion that the coupling member 14 may pivot relative to the second attachment member 16 when the ball 36 is attached to the inner housing member 70 with collar 84. In one embodiment the angle axis E is between 30-60 degrees from axis D and more particularly may be about 45 degrees. In this embodiment, the collar 84 may include an aperture that is generally circular and the coupling member 14 may pivot along angle axis E 360 degrees about axis D.

Figure 4A:
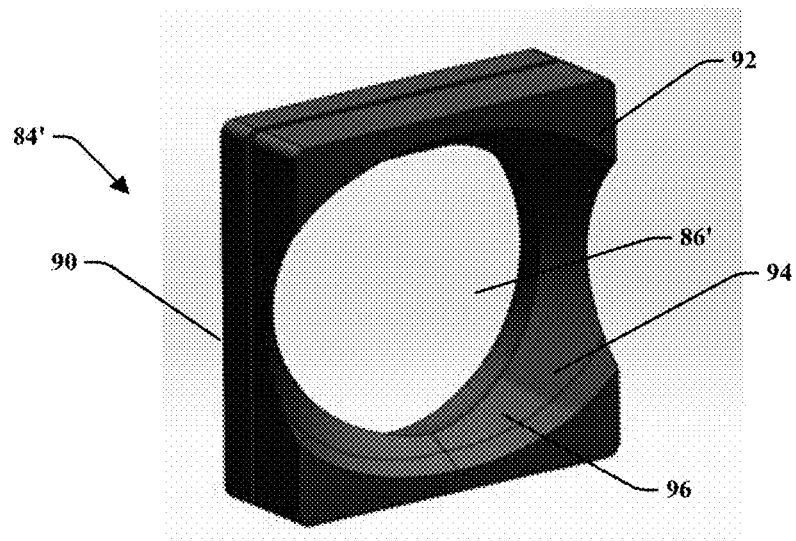
FIG. 4A is a perspective view of an embodiment of a collar of the articulated coupler of the present disclosure.
Figure 4B:
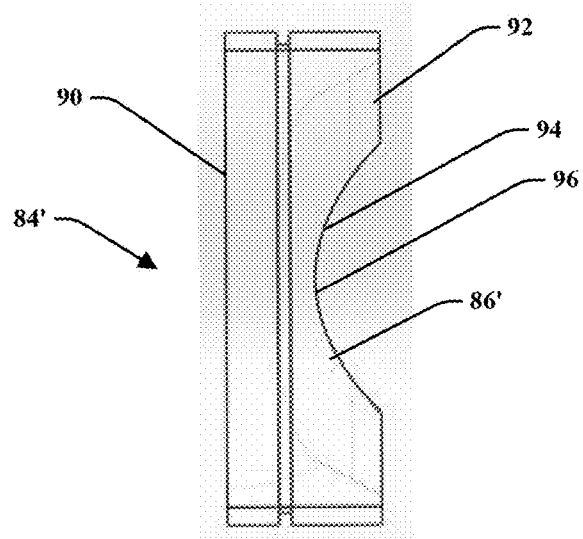
FIG. 4B is a side view of the collar of FIG. 4A.

Notably, the range of motion of the coupling member 14 relative to the second attachment member 16 may be adjusted by providing various arrangements of the collar 84. As illustrated in FIGS. 4A and 4B, another embodiment of the collar 84' may be provided. Here, the collar 84' includes an aperture 86' having a generally elliptical shape. However, the configuration of the aperture 86' may be other shapes such as circular, square or other polygon and this disclosure is not limited. In this embodiment, the collar 84' includes a first side 90 and a second side 92. The first side 90 may be configured to be received within the cavity 72 of the inner housing 70 and the second side 92 is configured to face the shaft 52 of the coupling member 14. The first side 90 may abut against the ball 36 and be attached to the cup 88 to position the ball between the cup 88 and the first side 90 of the collar 84'. The second side 92 may include a surface 94 having a concave shape 96. The ball 36 may be in direct contact with the first side 90 of the collar 84' while the shaft 52 may be pivoted to abut against the surface 94 of the second side 92 of the collar 84' along the limits of the pivotal range of motion for the coupling member 14 relative to the second attachment member 16. In one embodiment, the limits of the pivotal range of motion of the coupling member 14 relative to the second attachment member 16 along plane CD may be between 20-40 degrees and more particularly may be about 30 degrees. Additionally, the pivotal range of motion of the coupling member 14 relative to the second attachment member 16 along plane BD may be between 30-60 degrees and more particularly be about 45 degrees. This is due to the generally elliptical shaped aperture 86' and concave shape 96 of the collar 84'.

FIGS. 5-8C illustrate another embodiment of an articulated coupler 100 of the present disclosure. Hereinafter, like features are described with like reference numbers used in the description of the alternate embodiments.

In this embodiment, a cover 140 may be positioned around the coupling member 14. The cover 140 may be an elastic polymer that generally surrounds the coupling member 14 and reduce the exposure of moisture or debris from the first attachment member 12, the second attachment member 16 and the coupling member 14.

Additionally, the first attachment member 12 may include a connection member 240 to connect the coupling member 14 to the hitch member 18. In this embodiment, the connection member 240 may have a generally U shaped configuration that includes a first arm 260 and a second arm 280 that extend from opposite portions of a header 290 along the top and a base 300 along the bottom. The base 300 may include an aperture 32 that may align with the aperture 20 of the hitch member 18 for receiving the fastener 22 along a first axis A. The first arm 260 may be spaced from and include a similar configuration as the second arm 280. The connection member 240 may surround the extended portion 50 of the coupling member 14 as it is attached thereto.

The extended portion 50 may define the pivotal freedom of motion of the coupling member 14 relative to the connection member 240. In this embodiment, a damper 310 may be positioned along the extended portion 50 of the coupling member 14 within the connection member 240. The damper 310 may provide some freedom of motion to allow the coupling member to pivot in the first or second direction relative to axis B. However, in this embodiment the connection member 240 is attached to the hitch 18 to prevent rotational motion along axis A.

As the ball 36 of the coupling member 14 is pivoted in a first direction 27 relative to the connection member 240, the damper 310 positioned along the extended portion 50 may come in compressed contact with at least one of the header 290 of the connection member 240, the base 300 of the connection member 240, and the head 23 of the fastener and be prevented from further pivoting in the first direction 27. As the ball 36 of the coupling member 14 is pivoted in a second direction 29 relative to the connection member 240, the damper 310 may come in compressed contact with at least one of the header 290 of the connection member 240, the base 300 of the connection member 240, and the head 25 of the fastener 22 and be prevented from further pivoting in the second direction 29.

Figure 5:
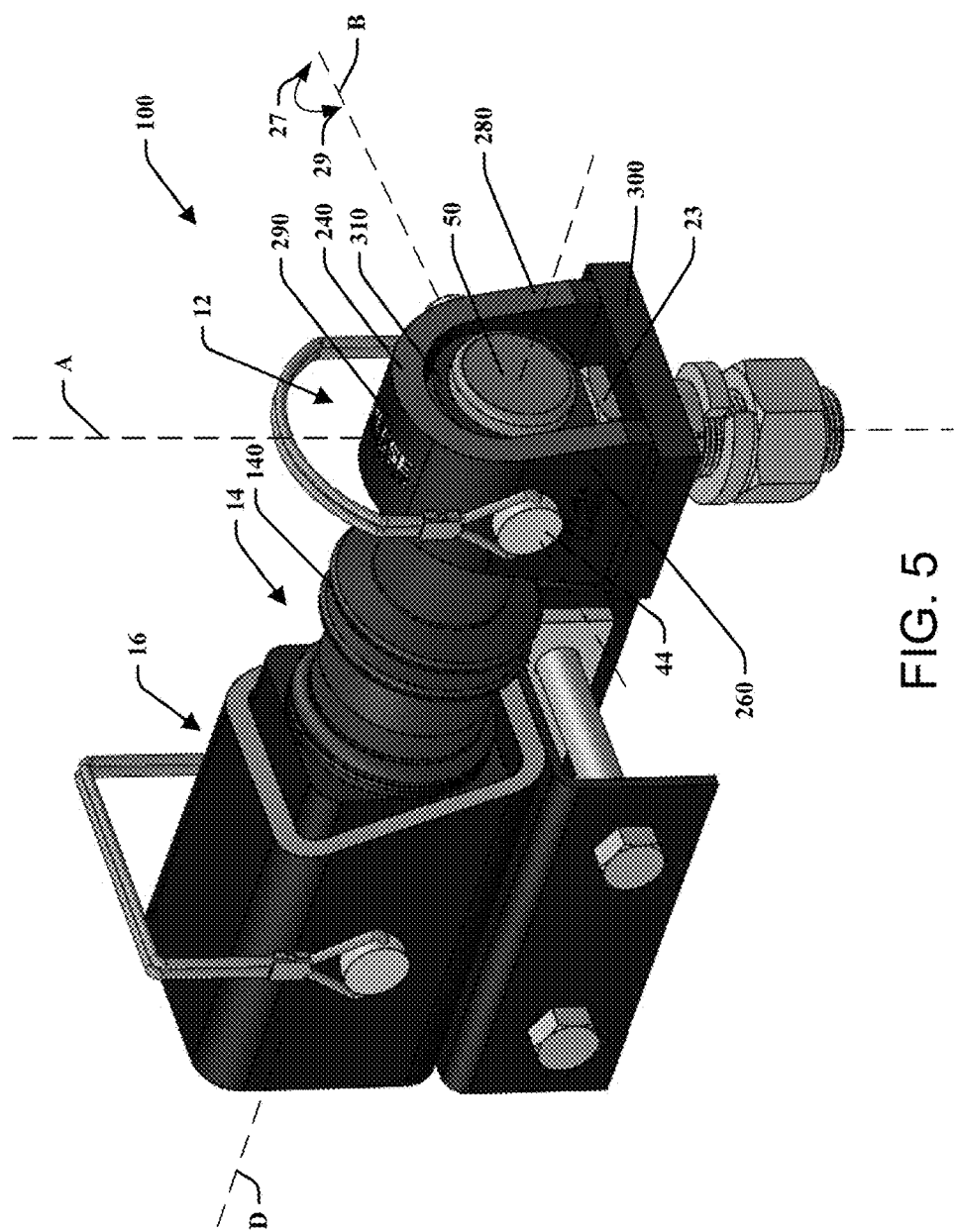
FIG. 5 is a perspective view of another embodiment of the articulated coupler of the present disclosure.

As generally illustrated by FIG. 5, the coupling member 14 is aligned along axis D. The described configuration allows for a range of motion of the coupling member 14 to be pivoted between about 0-20 degrees in the first direction 27 about the pin 44 along axis B within plan DA and more particularly about 10 degrees. Additionally, the coupling member 14 may be pivoted between about 0-20 degrees in the second direction 29 along axis B within plane DA about the pin 44 and more particularly about 10 degrees. This range of motion may be described as the pitch of the articulating coupler.

Figure 6:
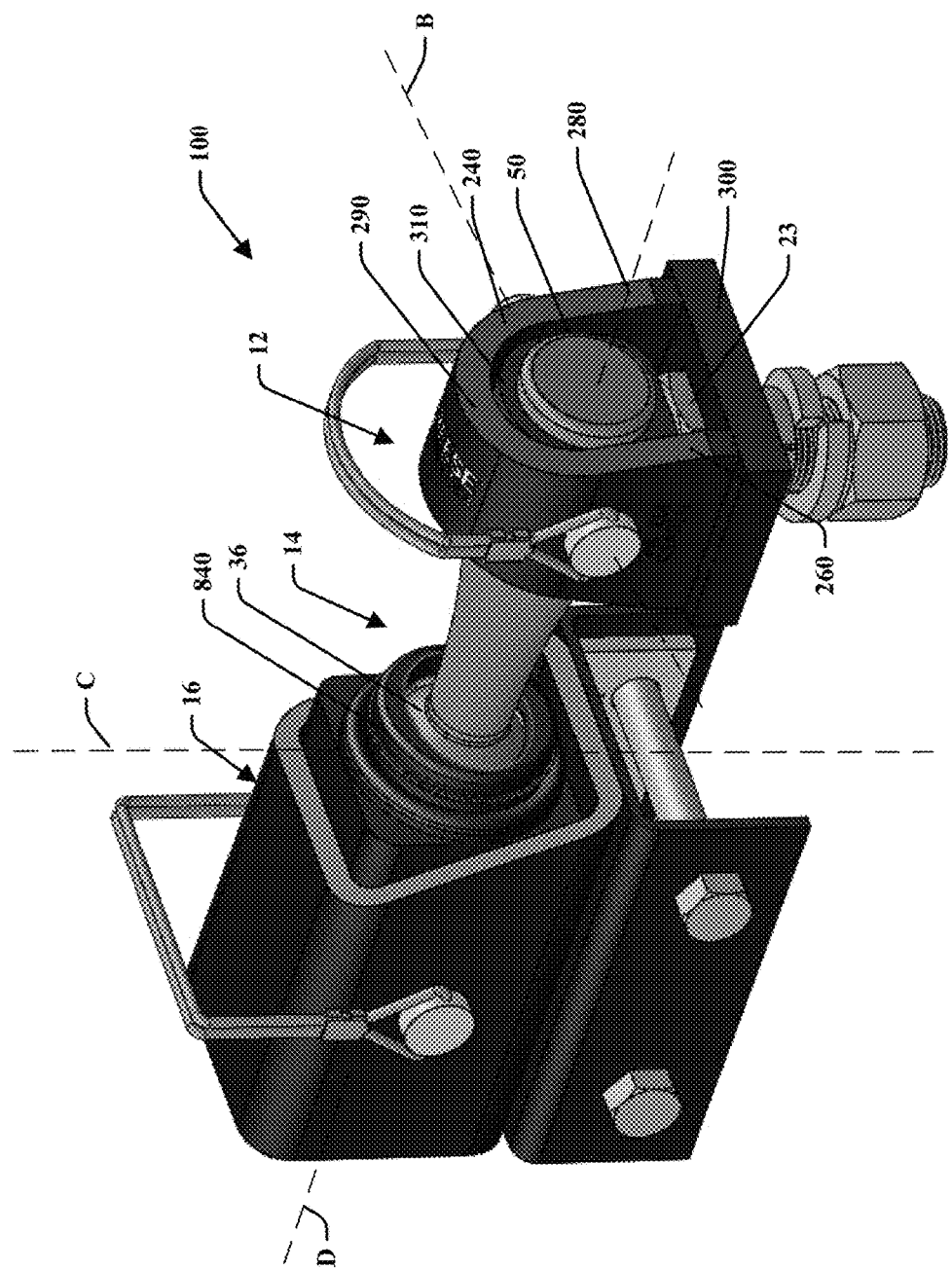
FIG. 6 is a perspective view of the articulated coupler of FIG. 5 without a deformable cover.
Figure 7:
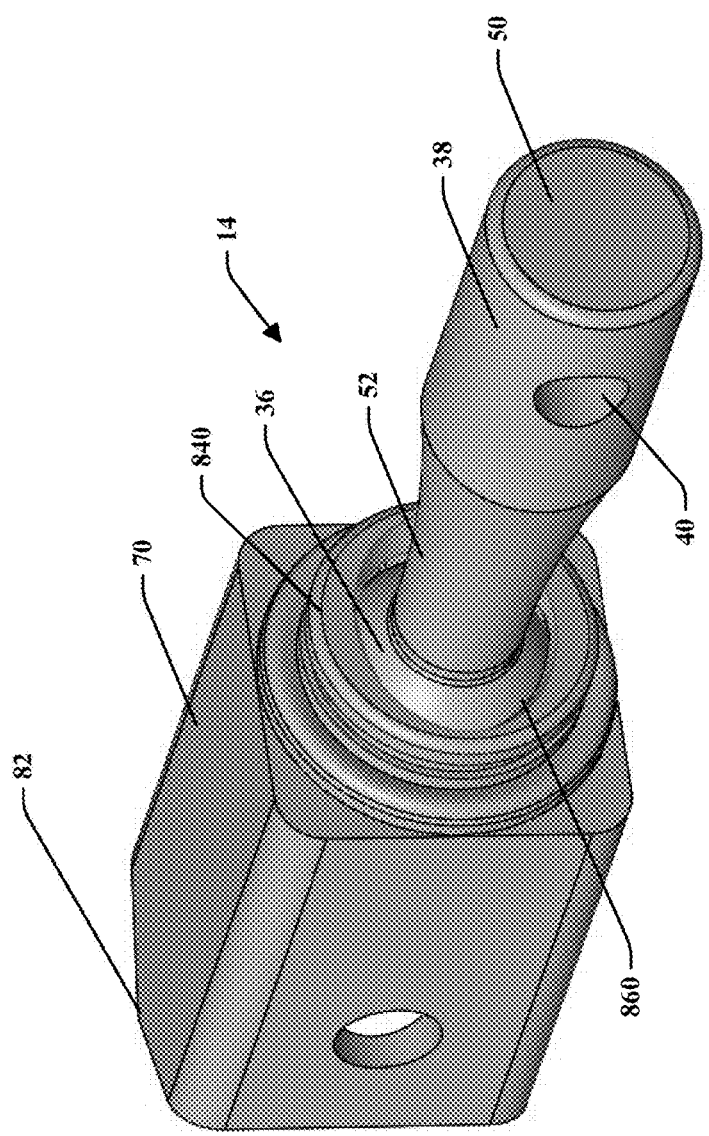
FIG. 7 is a perspective view of a coupling member attached to a second attachment member of the articulated coupler of FIG. 5.
Figure 8B:
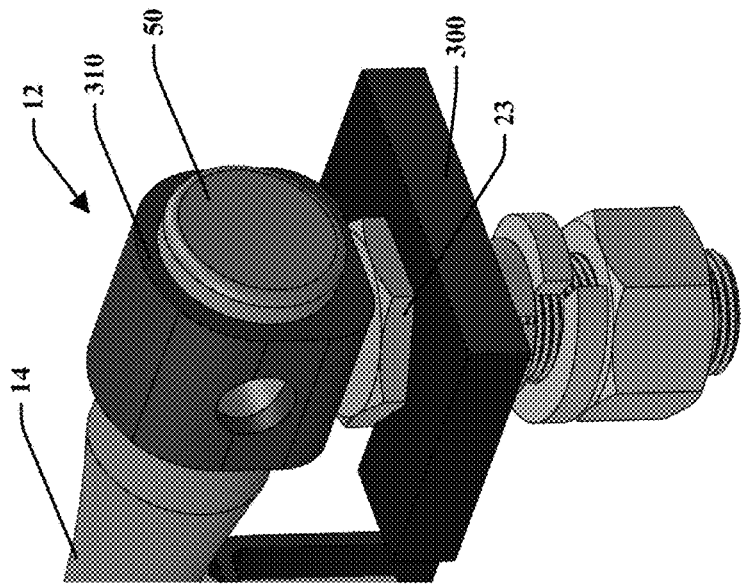
FIG. 8B is a perspective view of the first attachment member of FIG. 8A without a connection member.
Figure 8A:
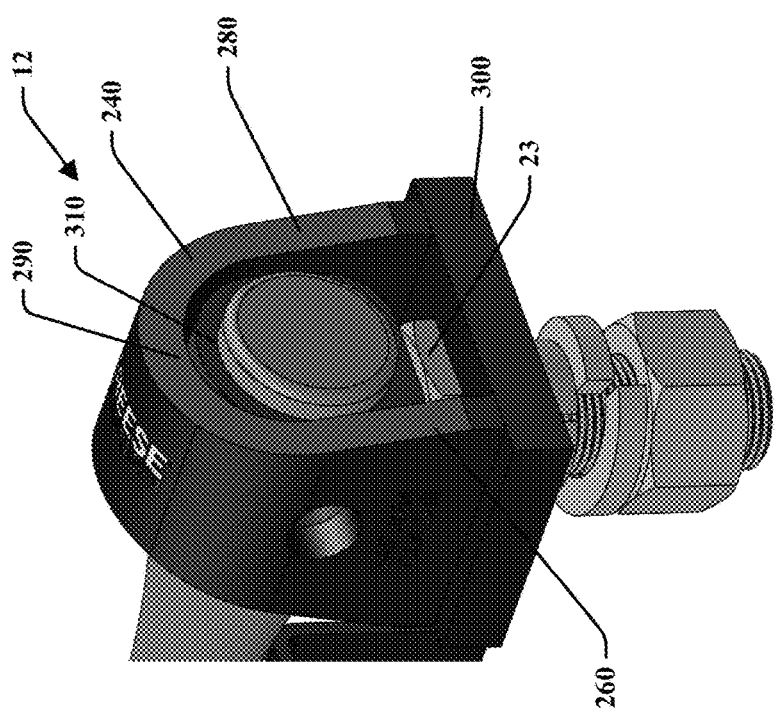
FIG. 8A is a perspective view of an embodiment of the coupling member attached to a first attachment member of the articulated coupler of FIG. 5.
Figure 8C:
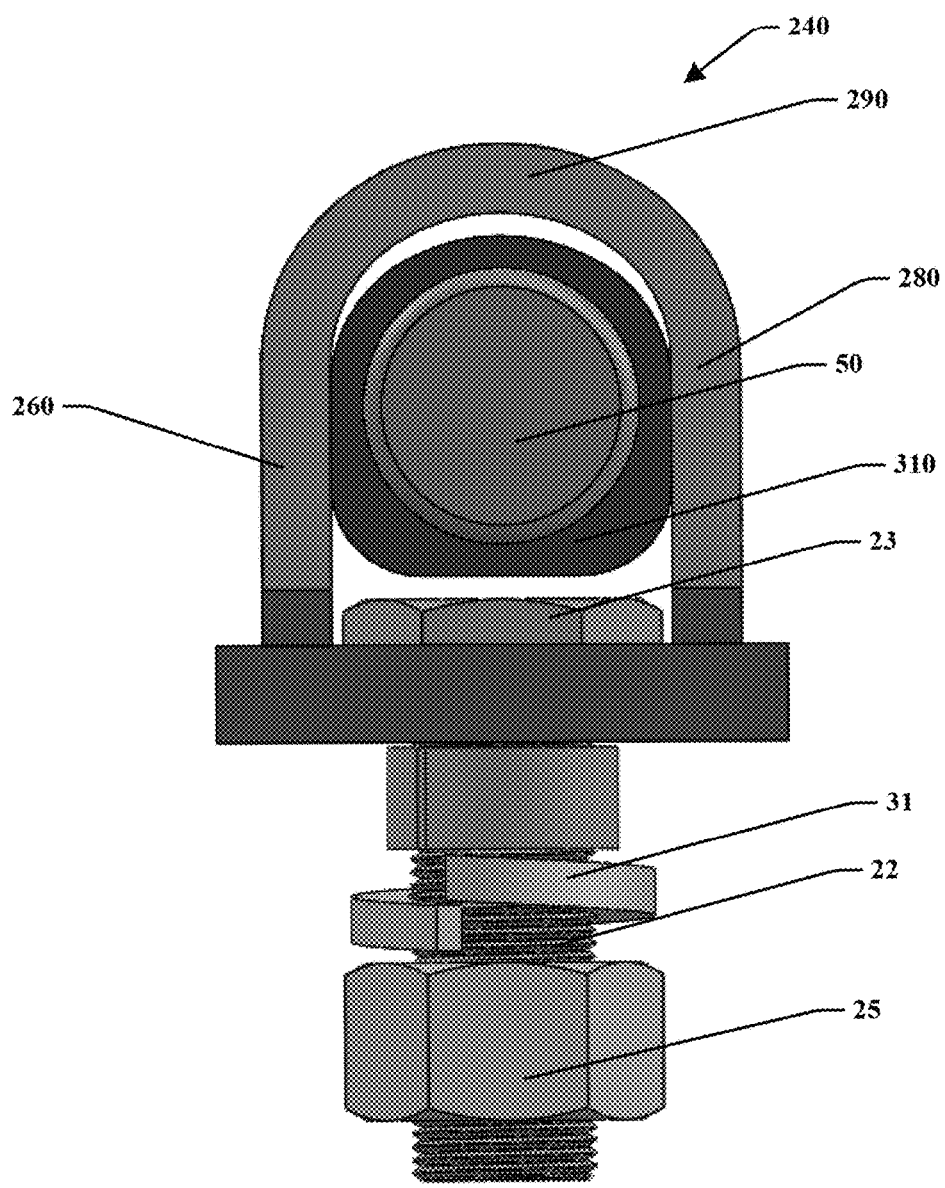
FIG. 8C is an end view of the first attachment member of FIG. 8A.

Notably, the range of motion of the coupling member 14 relative to the second attachment member 16 may be adjusted by providing various arrangements of the collar 840. As illustrated in FIGS. 6 and 7, an embodiment of the collar 840 may be provided. Here, the collar 840 includes an aperture 860 having a generally elliptical shape. However, the configuration of the aperture 860 may be other shapes such as circular, square or other polygon and this disclosure is not limit. In this embodiment, the collar 840 includes a concave shape along the perimeter of the aperture 860. The ball 36 may be in direct contact with the collar 840 while the shaft 52 may be pivoted to abut against the perimeter of the aperture 860 along the limits of the pivotal range of motion for the coupling member 14 relative to the second attachment member 16. In one embodiment, the limits of the pivotal range of motion of the coupling member 14 relative to the second attachment member 16 along plane CD may be between 20-40 degrees and more particularly may be about 32.5 degrees. This range of motion may be a total of 40-80 degrees and more particularly about 65 degrees both upwardly and downwardly relative to axis D along plane CD. This range of motion may be described as the pitch of the articulating coupler. The pitch of the articulating coupler may be defined by a combination of the range of motions along both axis B within plane DA and axis C within plane CD.

Additionally, the pivotal range of motion of the coupling member 14 relative to the second attachment member 16 along plane BD may be between 30-60 degrees and more particularly be about 45 degrees. This range of motion may be a total of about 60-120 degrees and more particularly about 90 degrees along both directions relative to axis D along plane BD. This is due to the generally elliptical shaped aperture 860 and concave shape of the collar 840. This range of motion may be described as the yaw of the articulating coupler.

The pivotal range of motion of the coupling member 14 relative to the second attachment member 16 may also include a roll with 360 degree range of motion. Further, the articulating coupler of the present disclosure may be attached to towed vehicles having that are either an open end trailer or a trailer that utilizes a traditional coupler.

Although the present embodiments have been illustrated in the accompanying drawings and described in the foregoing detailed description, it is to be understood that the bike carrier is not to be limited to just the embodiments disclosed, but that the bike carrier described herein is capable of numerous rearrangements, modifications and substitutions. The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. An articulating coupler comprising:
a first attachment member to be selectively attached to a towing vehicle;
a second attachment member to be selectively attached to a towed vehicle;
a coupling member attached to the first attachment member and the second attachment member such that the coupling member is pivotal relative to the first attachment member and the coupling member is rotatable and pivotal relative to the second attachment member, the coupling member including a ball at a proximal end and an elongated portion at an opposite distal end, the second attachment member including an opening and a collar to retain the ball of the coupling member.

2. The articulating coupler of claim 1, wherein the first attachment member is selectively attached to a hitch member of a vehicle.

3. The articulating coupler of claim 1, wherein the first attachment member includes a connection member to attach the first attachment member to the coupling member, the connection member including a base, a first arm, and a second arm that extend from opposite portions of the base such that the coupling member is attached between the first arm and the second arm.

4. The articulating coupler of claim 3, wherein the damper is positioned along an extended portion and received within the connection member.

5. The articulating coupler of claim 1, wherein the second attachment member includes an inner housing and an outer housing such that the inner housing is received within the outer housing.

6. The articulating coupler of claim 5, wherein the inner housing includes a tapered edge configured to be inserted within a cavity of the outer housing.

7. The articulating coupler of claim 5, wherein the ball of the coupling member is pivotal and rotatable relative to the inner housing of the second attachment member.

8. The articulating coupler of claim 7, wherein the collar, inner housing, and coupling member are configured to allow the coupling member to pivot within a range of motion relative to the second attachment member, wherein the range of motion is between 30-60 degrees from an axis of the coupling member.

9. The articulating coupler of claim 8 wherein the range of motion is about 45 degrees from the axis of the coupling member.

10. The articulating coupler of claim 5, wherein the collar is attached to the inner housing to retain the ball.

11. The articulating coupler of claim 1, wherein the collar includes an aperture having a generally elliptical shape to allow the coupling member to pivot and abut against a surface of the collar within a range of motion relative to the second attachment member.

12. The articulating coupler of claim 11, wherein the pivotal range of motion of the coupling member relative to the second attachment member along a first plane is between 20-40 degrees while the pivotal range of motion of the coupling member relative to the second attachment member along a second plane is between 30-60 degrees.

13. The articulating coupler of claim 12 wherein the first plane is generally perpendicular to the second plane.

14. An articulating coupler comprising:
a first attachment member to be selectively attached to a towing vehicle;
a second attachment member to be selectively attached to a towed vehicle;
a coupling member attached to the first attachment member and the second attachment member such that the coupling member is pivotal relative to the first attachment member and the coupling member is pivotal relative to the second attachment member; and
a cover positioned around the coupling member, the coupling member including a damper,
wherein the first attachment member includes a connection member to attach the second attachment member to the coupling member, the connection member further including a generally U-shaped configuration that comprises first and second arms extending from a header and a base of the connection member such that the coupling member is attached between the first and second arms.

15. The articulating coupler of claim 14, wherein the cover is positioned around a portion of the first attachment member and a portion of the second attachment member.

16. The articulating coupler of claim 14, wherein the damper is positioned along an extended portion of the coupling member and received within the connection member.

17. The articulating coupler of claim 16, wherein the coupling member is pivotal within a range of motion relative to the connection member, wherein the range of motion is between 0-20 degrees from an axis of the coupling member in a first direction and is between 0-20 degrees from the axis of the coupling member in a second opposite direction.

18. The articulating coupler of claim 16 wherein the articulating coupler includes a pitch along a first plane is between 40-80 degrees, wherein the pitch is a combined range of motion along a first axis aligned between the coupling member and the first attachment member and a second axis aligned between the coupling member and the second attachment member.

19. The articulating coupler of claim 18 wherein the articulating coupler includes a pivotal range of motion between the coupling member and the second attachment member along a second plane that is generally perpendicular to the first plane is between 60-120 degrees.

20. An articulating coupler comprising:
a first attachment member to be selectively attached to a towing vehicle;
a second attachment member to be selectively attached to a towed vehicle;
a coupling member attached to the first attachment member and the second attachment member such that the coupling member is pivotal relative to the first attachment member and the coupling member is rotatable and pivotal relative to the second attachment member within a pivotal range of motion, wherein the pivotal range of motion of the coupling member relative to the second attachment member along a first plane is between 20-40 degrees while the pivotal range of motion of the coupling member relative to the second attachment member along a second plane is between 30-60 degrees.

21. The articulating coupler of claim 20, wherein the first plane is generally perpendicular to the second plane.

\* \* \* \* \*